US010069864B2

(12) United States Patent
Anantharaju

(10) Patent No.: US 10,069,864 B2
(45) Date of Patent: Sep. 4, 2018

(54) METHOD AND SYSTEM FOR USING SMART IMAGES

(71) Applicant: ORACLE INTERNATIONAL CORPORATION, Redwood Shores, CA (US)

(72) Inventor: Girish Anantharaju, San Jose, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/663,555

(22) Filed: Mar. 20, 2015

(65) Prior Publication Data
US 2016/0277443 A1    Sep. 22, 2016

(51) Int. Cl.
G06F 11/00 (2006.01)
G06F 12/16 (2006.01)
(Continued)

(52) U.S. Cl.
CPC .......... H04L 63/1483 (2013.01); G06F 21/41 (2013.01); G06F 21/445 (2013.01);
(Continued)

(58) Field of Classification Search
CPC ........ G06F 21/36; G06F 21/602; G06F 21/64; G06F 2221/2107; G06F 2221/2113; H04L 9/0872
(Continued)

(56) References Cited

U.S. PATENT DOCUMENTS 6,269,446 B1 *  7/2001  Schumacher ...... H04N 1/32128
                                                      380/30
8,977,260 B1     3/2015  Dawson et al.
(Continued)

FOREIGN PATENT DOCUMENTS

WO    2016153766    9/2016

OTHER PUBLICATIONS

PCT/US2016/021128, "International Search Report and Written Opinion", dated May 20, 2016, 14 pages.
(Continued)

Primary Examiner — Gary S Gracia
(74) Attorney, Agent, or Firm — Kilpatrick Townsend & Stockton LLP

(57) ABSTRACT

Embodiments of the invention provide systems and methods for using an anti-phishing image. More specifically, embodiments of the present invention provide for using a non-static, location-based anti-phishing image that can, in some cases, include authentication information. According to one embodiment, a user with a trusted mobile device can go to a particular location during enrollment with an online service or application. This location can be detected by the mobile device, e.g., through a Global Positioning System (GPS) receiver and/or other location detection techniques. Once detected, this location can be provided by the mobile device to the service or application with which the user is registering and saved by the service or application as a "secret location." Also during enrollment, the user can select an anti-phishing image. Once saved, the location information can be used for anti-phishing as well as authentication purposes.

18 Claims, 8 Drawing Sheets

(51) Int. Cl.
*H04L 29/06* (2006.01)
*H04W 12/12* (2009.01)
*G06F 21/41* (2013.01)
*G06F 21/44* (2013.01)

(52) U.S. Cl.
CPC ........... *H04L 63/107* (2013.01); *H04W 12/12* (2013.01); *G06F 2221/2119* (2013.01); *G06F 2221/2133* (2013.01); *H04L 63/0838* (2013.01)

(58) Field of Classification Search
USPC .......................................... 713/189; 726/77
See application file for complete search history.

(56) References Cited

U.S. PATENT DOCUMENTS

| | | | | |
|---|---|---|---|---|
| 9,300,645 | B1* | 3/2016 | Rao | H04L 63/08 |
| 2001/0033661 | A1* | 10/2001 | Prokoski | H04L 9/3297 |
| | | | | 380/258 |
| 2002/0136407 | A1 | 9/2002 | Denning et al. | |
| 2004/0208343 | A1* | 10/2004 | Golden | A01K 11/008 |
| | | | | 382/110 |
| 2006/0248348 | A1* | 11/2006 | Wakao | H04N 1/32101 |
| | | | | 713/186 |
| 2007/0074119 | A1* | 3/2007 | Komine | G06F 21/36 |
| | | | | 715/743 |
| 2007/0083919 | A1* | 4/2007 | Heffez | G06F 21/36 |
| | | | | 726/5 |
| 2007/0244761 | A1* | 10/2007 | Scipioni | G06F 21/64 |
| | | | | 705/18 |
| 2008/0034428 | A1 | 2/2008 | Bejar et al. | |
| 2008/0052245 | A1* | 2/2008 | Love | G06F 21/36 |
| | | | | 705/76 |
| 2010/0287382 | A1* | 11/2010 | Gyorffy | G06F 21/36 |
| | | | | 713/185 |
| 2011/0145587 | A1* | 6/2011 | Park | G06F 21/36 |
| | | | | 713/182 |
| 2011/0277024 | A1* | 11/2011 | Begley | H04L 63/08 |
| | | | | 726/7 |
| 2012/0289209 | A1* | 11/2012 | Crawford | G06Q 10/0637 |
| | | | | 455/414.1 |
| 2012/0304284 | A1* | 11/2012 | Johnson | H04L 9/3226 |
| | | | | 726/19 |
| 2013/0031623 | A1* | 1/2013 | Sanders | G06F 21/34 |
| | | | | 726/19 |
| 2013/0036461 | A1* | 2/2013 | Lowry | G06F 21/36 |
| | | | | 726/19 |
| 2013/0097697 | A1* | 4/2013 | Zhu | G06F 21/31 |
| | | | | 726/18 |
| 2013/0117834 | A1* | 5/2013 | Ishioka | H04L 63/0869 |
| | | | | 726/7 |
| 2013/0138968 | A1* | 5/2013 | Yudkin | G06F 21/602 |
| | | | | 713/183 |
| 2013/0256403 | A1* | 10/2013 | MacKinnon Keith | G06K 5/00 |
| | | | | 235/375 |
| 2013/0268775 | A1* | 10/2013 | Hawkins | G06F 21/64 |
| | | | | 713/189 |
| 2013/0286248 | A1* | 10/2013 | Alfarano | G01S 19/14 |
| | | | | 348/231.3 |
| 2014/0009378 | A1* | 1/2014 | Chew | G06F 3/017 |
| | | | | 345/156 |
| 2014/0122889 | A1* | 5/2014 | Freund | G01S 19/14 |
| | | | | 713/176 |
| 2014/0201536 | A1* | 7/2014 | Fiske | H04L 9/0844 |
| | | | | 713/183 |
| 2014/0279096 | A1* | 9/2014 | Akin | G06Q 20/401 |
| | | | | 705/16 |
| 2014/0281946 | A1* | 9/2014 | Avni | G06T 1/0021 |
| | | | | 715/268 |
| 2014/0282973 | A1* | 9/2014 | Langley | H04L 63/08 |
| | | | | 726/7 |
| 2015/0102907 | A1* | 4/2015 | Hadizad | G07C 9/00007 |
| | | | | 340/5.64 |
| 2015/0139482 | A1* | 5/2015 | Zennaro | G06K 9/3258 |
| | | | | 382/103 |
| 2015/0249540 | A1* | 9/2015 | Khalil | H04L 63/0853 |
| | | | | 713/158 |
| 2015/0310556 | A1* | 10/2015 | Kiper | G06Q 30/0283 |
| | | | | 705/4 |

OTHER PUBLICATIONS

Sathyan, "Multi-layered collaborative approach to address enterprise mobile security challenges", Collaborative Security Technologies, 2010 IEEE 2nd Workshop on, IEEE, Dec. 15, 2010, pp. 1-6.

* cited by examiner

METHOD AND SYSTEM FOR USING SMART IMAGES

BACKGROUND OF THE INVENTION

Embodiments of the present invention relate generally to methods and systems for establishing trust between parties to an online interaction and more particularly to using a non-static, location-based anti-phishing image that can, in some cases, include authentication information.

As online activity, and in particular online commerce, continues to grow, the incidence of online scams and schemes grows at an equal, if not greater, pace. For example, phishing operations often involve mass contact of consumers (e.g., by "spam" email messages, text messages, VoIP calls, instant messages, etc. as well as through other devices) claiming to be from a particular, and probably well-known, company or other entity and generally direct contacted consumers to a response site, which often is a web site but can also be a telephone number, etc. The response site may appear to be that of the company or entity indicated by the message but is, however, fraudulent and not associated with that company or other entity. Rather, the site is designed to lure the consumers into providing personal information such as passwords, account numbers, etc. that can then be used by the criminals operating the phishing site.

To prevent phishing attacks many or most online solutions today use anti-phishing images as a way to establish trust and to ensure the end user that he has entered the correct website. For example, upon registering with a known site of a particular company or other entity, the user can select or provide a particular image. Upon future visits to this site, typically as part of a login process, this image can be provided to the user as a quick and easy visual confirmation that the site is indeed the same, trusted site. However, current anti-phishing images used in most online solutions are static images. As such, it is still relatively easy for a hacker to setup a phishing site and harvest the user information if the hacker is able to steal or otherwise determine the image used. Additionally, knowledge based authentication, One Time Passwords (OTPs) delivered by Short Message Service (SMS) or email OTP or combinations of these methods used as secondary authentication have their own limitations. Hence, there is a need for improved methods and systems for establishing trust between parties to an online interaction.

BRIEF SUMMARY OF THE INVENTION

Embodiments of the invention provide systems and methods for using an anti-phishing image. According to one embodiment, using an anti-phishing image can comprise providing a registration function of a service. The registration function can provide selection of the anti-phishing image from a plurality of anti-phishing images. The registration function can receive a selection of the anti-phishing image and location information indicating a location determined and provided by a mobile device during access of the registration function. The selected anti-phishing image and the received location information can be saved as a registered location. At another time, a request to access the service can be received. The saved anti-phishing image and registered location can be retrieved and used in a response to the request and an access process for the service.

For example, using the retrieved anti-phishing image and registered location in the response to the request and the access process for the service can comprise generating a unique access code, adding the generated unique access code to the anti-phishing image, encrypting the anti-phishing image with the added unique access code using the registered location, and providing the encrypted anti-phishing image in response to the received request to access the service. The mobile device can receive the encrypted anti-phishing image, decrypting the encrypted anti-phishing image with location information determined by the mobile device based on a current location of the mobile device, presenting the decrypted anti-phishing image, and may, in some cases, provide to the service or another device the access code from the decrypted anti-phishing image. The service can in turn receive a response from the mobile device or other device. The response can include an access code. In response to the received access code matching the generated unique access code, access to the service can be granted.

In another example, using the retrieved anti-phishing image and registered location in the response to the request and the access process for the service can comprise hashing the registered location, adding the hashed registered location to a header of the anti-phishing image, and providing the anti-phishing image to the mobile device. The mobile device can receive the anti-phishing image at the mobile device, present the received anti-phishing, generate a hash of the current location of the mobile device, and determine whether the hashed registered location received in the header of the anti-phishing image matches the generated hash of the current location of the mobile device. In response to the hashed registered location received in the header of the anti-phishing image matching the generated hash of the current location of the mobile device the mobile device can request an access code. The service can receive the request for access to the service from the mobile device and provide a unique access code to the mobile device which can be used to access the service.

DETAILED DESCRIPTION OF THE INVENTION

Figure 1:
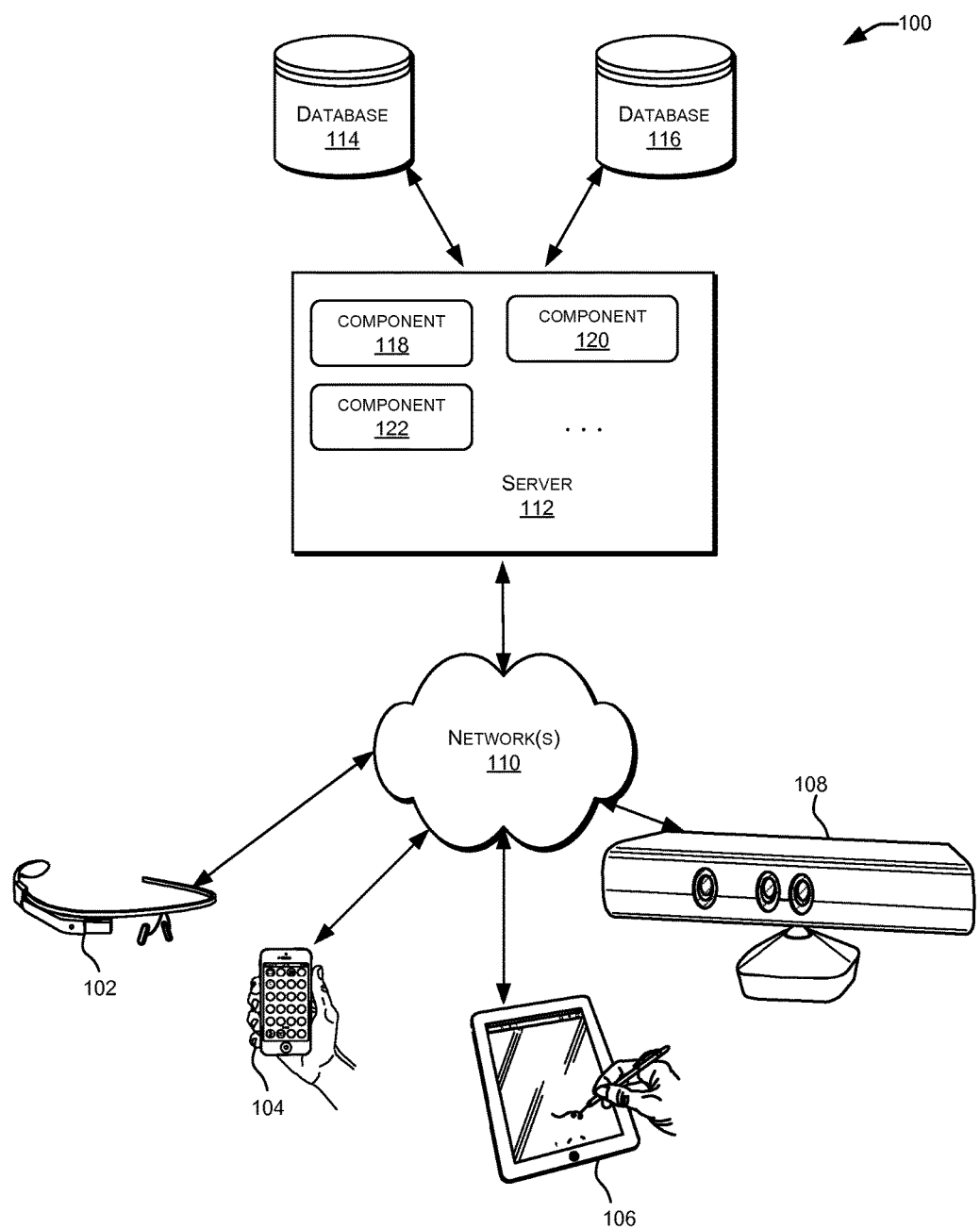
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for using an anti-phishing image. More specifically, embodiments of the present invention provide for using a non-static, location-based anti-phishing image that can, in some cases, include authentication information. According to one embodiment, a user with a trusted mobile device can go to a particular location during enrollment with an online service or application. This location can be detected by the mobile device, e.g., through a Global Positioning System (GPS) receiver and/or other location detection techniques. Once detected, this location can be provided by the mobile device to the service or application with which the user is registering and saved by the service or application as a "secret location." Also during enrollment, the user can select an anti-phishing image. Once saved, the location information can be used for anti-phishing as well as authentication purposes.

For example, the location information can be used by the service or application to encrypt the anti-phishing image which can be sent to the mobile device or other computing device which transfers the encrypted image to the mobile device whenever the user attempts to access the service or application. Once the image has been obtained by the mobile device, the mobile device can detect its current location and attempt to decrypt the image using that current location. If or when the mobile device is in the same "secret location" as when registering, the image can be properly decrypted and thus presented to the user in a recognizable form as the originally selected image. Additionally, in some cases, the image may be marked by the service or application with a code such as a One Time Password (OTP) or Completely Automated Public Turing test to tell Computers and Humans Apart (CAPTCHA) code prior to encryption. For example, a code can be generated and added to the image as a watermark or overlay before the image is encrypted. Once the image has been decrypted by the mobile device, the user can then use this code to complete a login and/or authentication process with the service or application.

In another example, whenever the user attempts to access the service or application, the image can be provided to the user by the service or application in the original, unencrypted form but with an encrypted or hashed version of the saved location information contained in its header. Once the mobile device is in the same "secret location" as when registering, the location information in the header can be properly decrypted by the mobile device and used by the mobile device to obtain from the service or application a new image containing the OTP or CAPTCHA code, which the user can then use to complete the login and/or authentication process with the service or application.

In either case, the location information obtained during registration can be used not only to make the anti-phishing image more secure, but also to replace weaker knowledge-based and SMS or email OTP-type authentication methods. Embodiments described herein can be used in situations where enhanced security is required or appropriate and can be related to particular physical locations. For example, access to an enterprise system or application may be related and limited to a user's office. Certain functions of the application or service with which the user is registered, such as changing the registration information, may be limited to the particular location used during registration. For example, an online banking or other, similar service, may limit access to account information or certain functions like initiating transfers to be available only when the user is determined, based on the current location of the mobile device, to be in the registered location such as his home. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry®, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
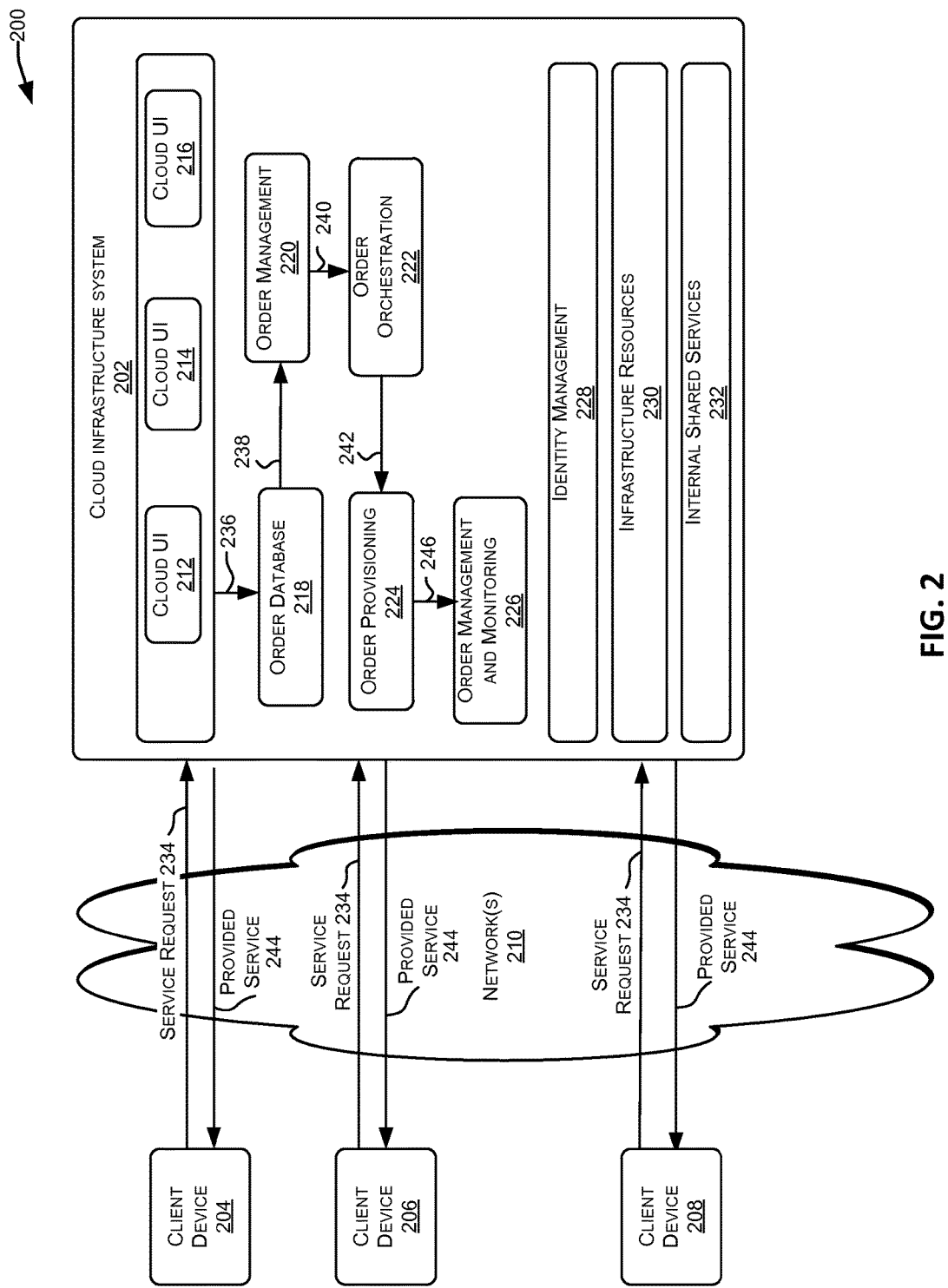
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
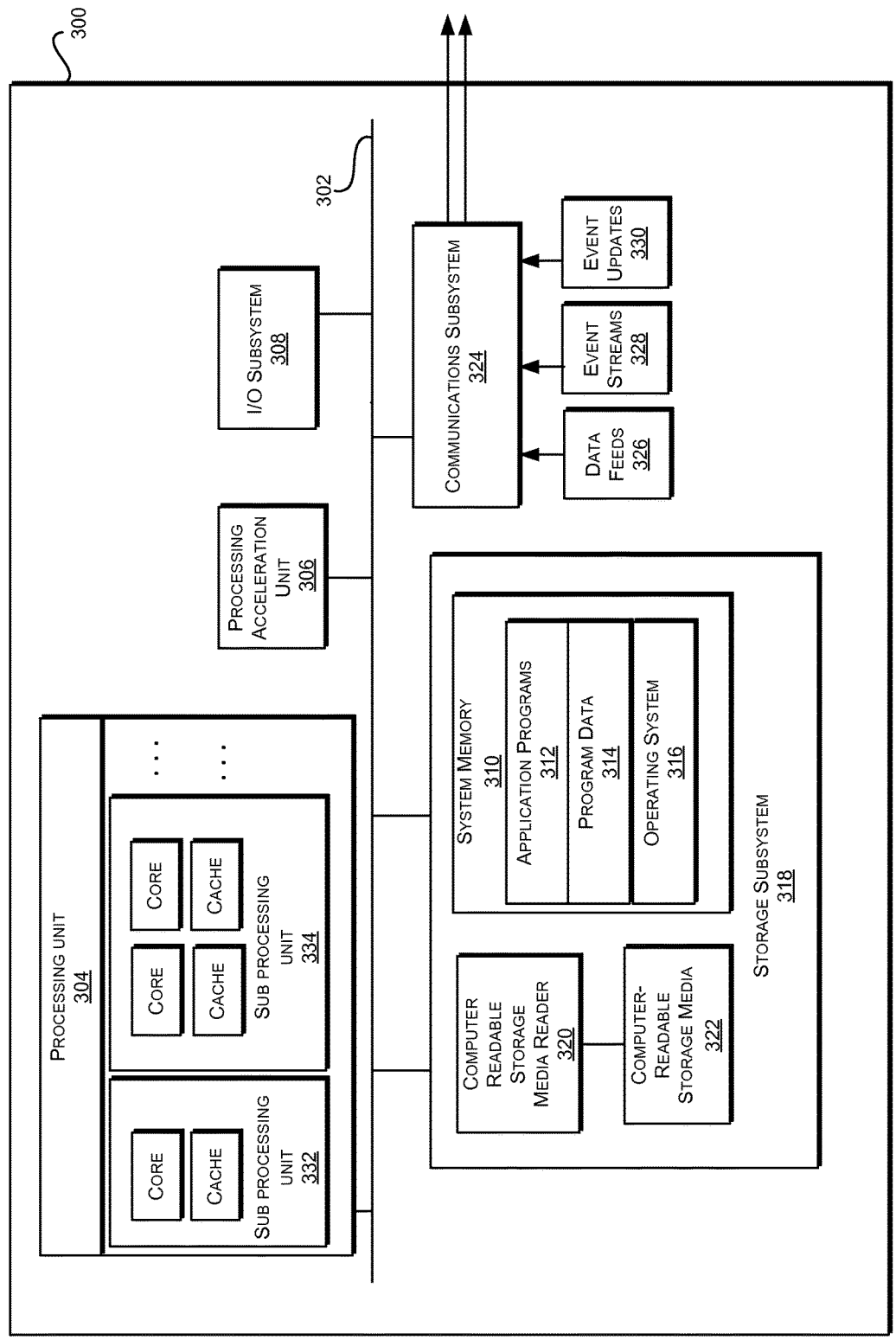
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
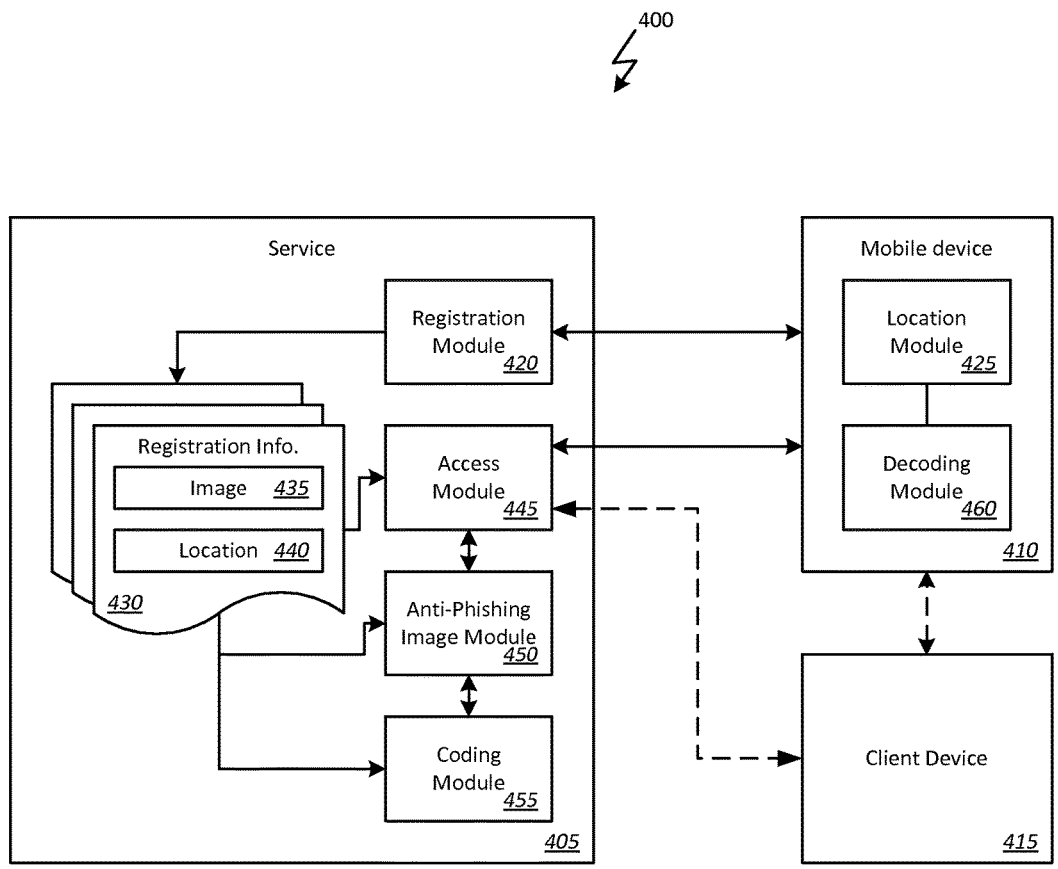
FIG. 4 is a block diagram illustrating, at a high-level, functional components of a system for using an anti-phishing image according to one embodiment of the present invention.

FIG. 4 is a block diagram illustrating, at a high-level, functional components of a system for using an anti-phishing image according to one embodiment of the present invention. As illustrated in this example, the system 400 can include a service 405, such as an online e-commerce service, online banking service, or any other such service. This service can be provided by one or more enterprise or other applications executing on one or more servers of other computing devices as described above. Mobile devices 410 and/or other client devices 415 such as described above can access the service over the Internet or any other local area or wide area network (not shown here) as also described above. To establish trust between users of the mobile device 410 and/or other client device 415 when accessing the service 405, anti-phishing images can be used.

As introduced above, embodiments of the present invention provide for using a non-static, location-based anti-phishing image that can, in some cases, include authentication information. According to one embodiment, a user with a trusted mobile device 410 can go to a particular physical location to perform an enrollment process with the service. This enrollment process may be accessible through a website or other interface provided by a registration module 420 of the online service 405. The particular physical location can be detected by the mobile device 410, e.g., through a location module 425 such as a Global Positioning System (GPS) receiver. Once detected, this location can be provided by the mobile device 410 to the registration module 420 of the service 405 with which the user is registering. The registration module 420 can save this registered location 440 in a set of registration information 430 for the user. Also during enrollment, the user can select an anti-phishing image 435 which can also be saved by the registration module 420 of the service 405 in the registration information 430 for the user.

Stated another way, registering an anti-phishing image can comprise providing a registration function to a user of the service 405, for example, through a registration website or other interface provided by the registration module 420. The registration function of the registration module 420 can provide for selection of the anti-phishing image from a plurality of anti-phishing images. The user can access this website or interface through a mobile device 410 and/or other client device 415. Once the registration function is accessed, the user can select one of the anti-phishing images as known in the art. During access of the registration module 420 by the user, the location of the mobile device 410 can be determined. For example, a set of latitude-longitude coordinates or other location information can be determined by the location module 425 of the mobile device 410 using a GPS receiver, cell tower triangulation, or by other methods known in the art. Such location information can be provided by the mobile device 410 or other client device 415 to the registration module 420 along with an indication of the selected anti-phishing image. The selection of the anti-phishing image and location information indicating a location of the mobile device of the user can be received by the service through the registration module 420. The selected anti-phishing image 435 can be saved in registration information for the user for use by the service 405. Additionally, the received location information can be saved in the registration information 430 as a registered location 440 for the user. The selected anti-phishing image 435 and registered location 440 for the user can then be used by the service 405 in subsequent access of the service 405 by the same user.

Once saved, the location information can be used for anti-phishing as well as authentication purposes. For example, an access module 445 of the service 405 can provide a portal or login website or other interface through which a user can initiate an interaction with the service. The user can access this website or interface through the mobile device 410 and/or other client device 415. In turn, the access module 445 of the service 405 can receive an access request from the user. In response to this request, the saved anti-phishing image and registered location of the user can be retrieved by the access module 445 and used in an access process for the user. The anti-phishing image and registered location of the user can be used by the access module 445, the mobile device 410, and/or other client device 415 in different ways and in different combinations depending upon the exact implementation.

For example, the registered 440 location information can be used by a coding module 455 of the service 405 to encrypt the registered anti-phishing image 435 which can be sent to the mobile device 410 or other client device 415 which transfers the encrypted image to the mobile device 410 whenever the user attempts to access the service 405. Once the image has been obtained by the mobile device 410, the location module 425 of the mobile device 410 can detect its current location and a decoding module 460 of the mobile device 410 can attempt to decrypt the image using that current location. If or when the mobile device 410 is in the same location as when registering, the image can be properly decrypted by the decoding module 460 and thus presented by the mobile device 410 or transferred back to the other client device 415 for presentation to the user in a recognizable form as the originally selected image. Additionally, in some cases, the image may be marked by an anti-phishing image module 450 of the service 405 with a code such as a One Time Password (OTP) or Completely Automated Public Turing test to tell Computers and Humans Apart (CAPTCHA) code prior to encryption by the coding module 455. For example, a code can be generated by the access module 445 and added to the image by the anti-phishing image module 450 as a watermark or overlay before the image is encrypted by the coding module 455. Once the image has been decrypted by the mobile device 410, the user can then use this code to complete a login and/or authentication process with the service 405.

Stated another way, using the retrieved anti-phishing image 435 and registered location 440 of the user in the response to the request and the access process for the user can comprise the access module 455 generating a unique access code, the anti-phishing image module 450 adding the generated unique access code to the anti-phishing image 435, the coding module 455 encrypting the anti-phishing image with the added unique access code using the registered location 440, and the access module 445 providing the encrypted anti-phishing image to the user through the mobile device 410 and/or other client device 415.

The mobile device 410 and/or other client device 415 can receive the encrypted anti-phishing image and the decoding module 460 of the mobile device 410 can attempt to decrypt it with location information determined by the location module 425 based on a current location of the mobile device 410. The decrypted anti-phishing image can be presented to the user through the mobile device 410 or other client device 415. If the mobile device 410 is at the same location as the registered location, the image can be properly decoded and thus made visible/recognizable to the user. The user can then recognize the anti-phishing image and also read the included access code. This code can then be used by the user to access the service 405. In other words, the access code from the decrypted anti-phishing image can be provided by the mobile device 410 or other client device 415 back to the access module 445 of the service 405.

The service 405 in turn can receive the response from the user including the access code. A determination can then be made by the access module 445 as to whether the code is correct, i.e., matches the generated access code provided with the image. In response to determining the access code received from the user matches the generated unique access code, access to the service 405 can be granted to the user by the access module 445. If the access code received from the user does not match the generated unique access code, access to the service 405 can be denied by the access module 445.

In another example, whenever the user attempts to access the service 405, the anti-phishing image 435 can be provided to the user by the access module 445 in the original, unencrypted form but with an encrypted or hashed version of the registered location information 440 contained in its header. Once the mobile device 410 is in the same location as when registering, the location information in the header can be properly decrypted by the decoding module 460 of the mobile device 410 and used to obtain from the service 405 the OTP or CAPTCHA code, which the user can then use to complete the login and/or authentication process with the service 405.

Stated another way, using the retrieved anti-phishing image 435 and registered location 440 of the user in the response to the request and the access process for the user can comprise the coding module 455 encrypting the registered location, the anti-phishing image module 450 adding the encrypted registered location to a header of the anti-phishing image, and the access module 445 providing the anti-phishing image to the mobile device 410 and/or other client device 415.

The mobile device 410 and/or other client device 415 can receive the anti-phishing image and present the received anti-phishing image to the user. The decoding module 460 of the mobile device 410 can also attempt to decrypt the encrypted registered location from the header of the image with location information determined by the location module 425 based on a current location of the mobile device 410. If the mobile device 410 is at the same location as the registered location, the location information can be properly decoded. The mobile device 410 and/or client device 415 can then reply to the image with the decrypted version of the registered location from the header of the image.

The service 405 in turn can receive the decrypted version of the registered location from the user. A determination can then be made by the access module 445 as to whether the location information is correct, i.e., matches the retrieved registered location 440 for the user. In response to determining the location information received from the user matches the retrieved registered location 440 for the user, access to the service 405 can be granted to the user by the access module 445. If the location information received from the user does not match the retrieved registered location 440 for the user, access to the service 405 can be denied by the access module 445.

In either case, the location information obtained during registration can be used not only to make the anti-phishing image more secure, but also to replace weaker knowledge-based and SMS or email OTP-type authentication methods. Embodiments described herein can be used in situations where enhanced security is required or appropriate and can be related to particular physical locations. For example, access to an enterprise system or application may be related and limited to a user's office. Certain functions of the application or service with which the user is registered, such as changing the registration information, may be limited to the particular location used during registration. For example, an online banking or other, similar service, may limit access to account information or certain functions like initiating transfers to be available only when the user is determined, based on the current location of the mobile device, to be in the registered location such as his home.

Figure 5:
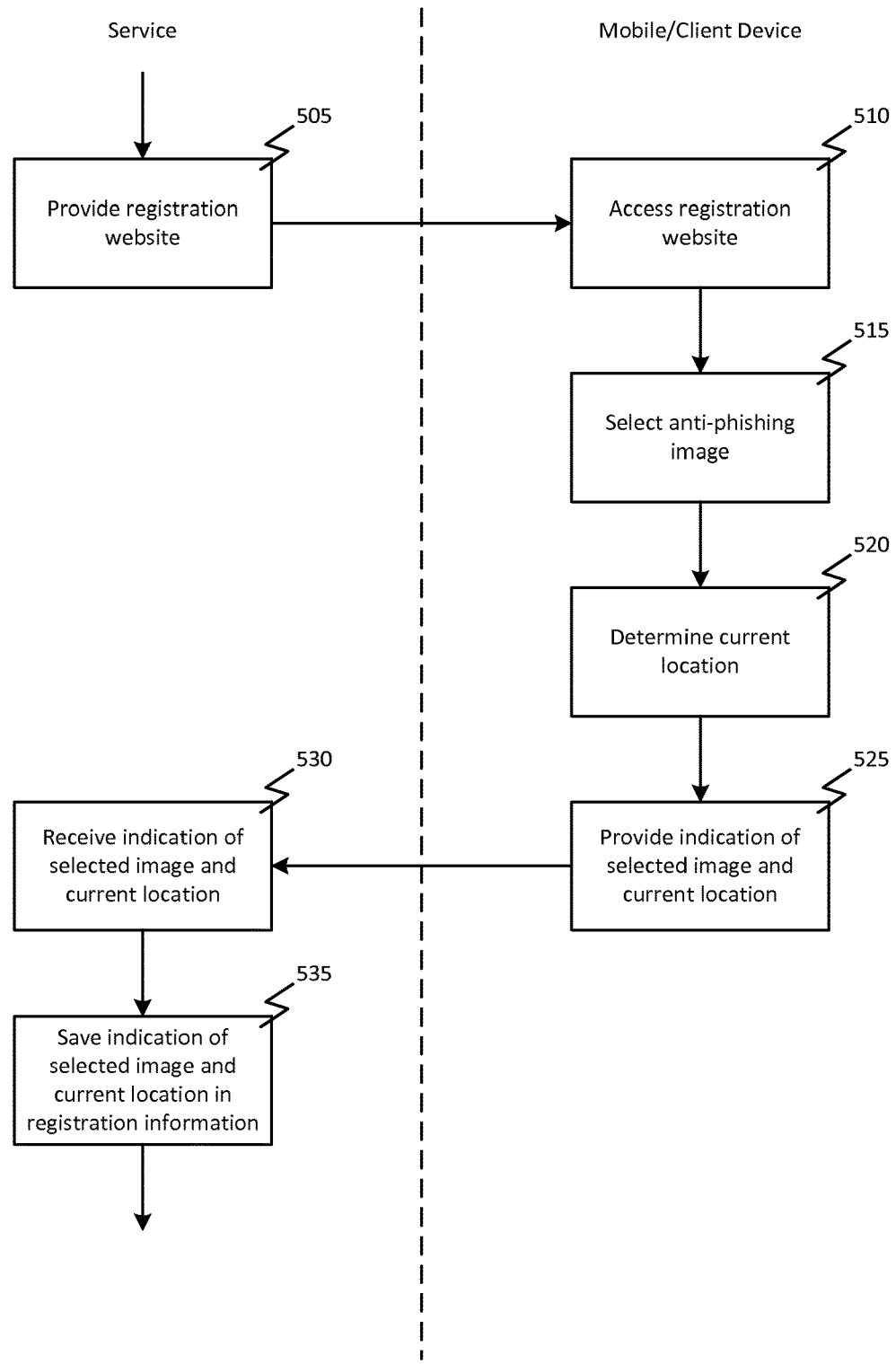
FIG. 5 is a flowchart illustrating a process for registering an anti-phishing image according to one embodiment of the present invention.

FIG. 5 is a flowchart illustrating a process for registering an anti-phishing image according to one embodiment of the present invention. As illustrated in this example, registering an anti-phishing image can comprise providing 505 a registration function to a user of a service, for example, through a registration website or other interface. The registration function can provide for selection of the anti-phishing image from a plurality of anti-phishing images. The user can access 510 this website or interface through a mobile device and/or other client device as described above. Once the registration function is accessed, the user can select one of the anti-phishing images as known in the art. During access of the registration function by the user, the location of the mobile device can be determined 520. For example, a set of latitude-longitude coordinates or other location information can be determined by a GPS receiver of the mobile device or by other methods known in the art. Such location information can be provided 525, by the mobile device to the registration function along with an indication of the selected anti-phishing image. The selection of the anti-phishing image and location information indicating a location of the mobile device of the user can be received 530 by the service through the registration function. The selected anti-phishing image can be saved 535 for use by the service. Additionally, the received location information can be saved 535 as a registered location for the user. The selected anti-phishing image and registered location for the user can then be used by the service in subsequent access of the service by the same user.

Figure 6:
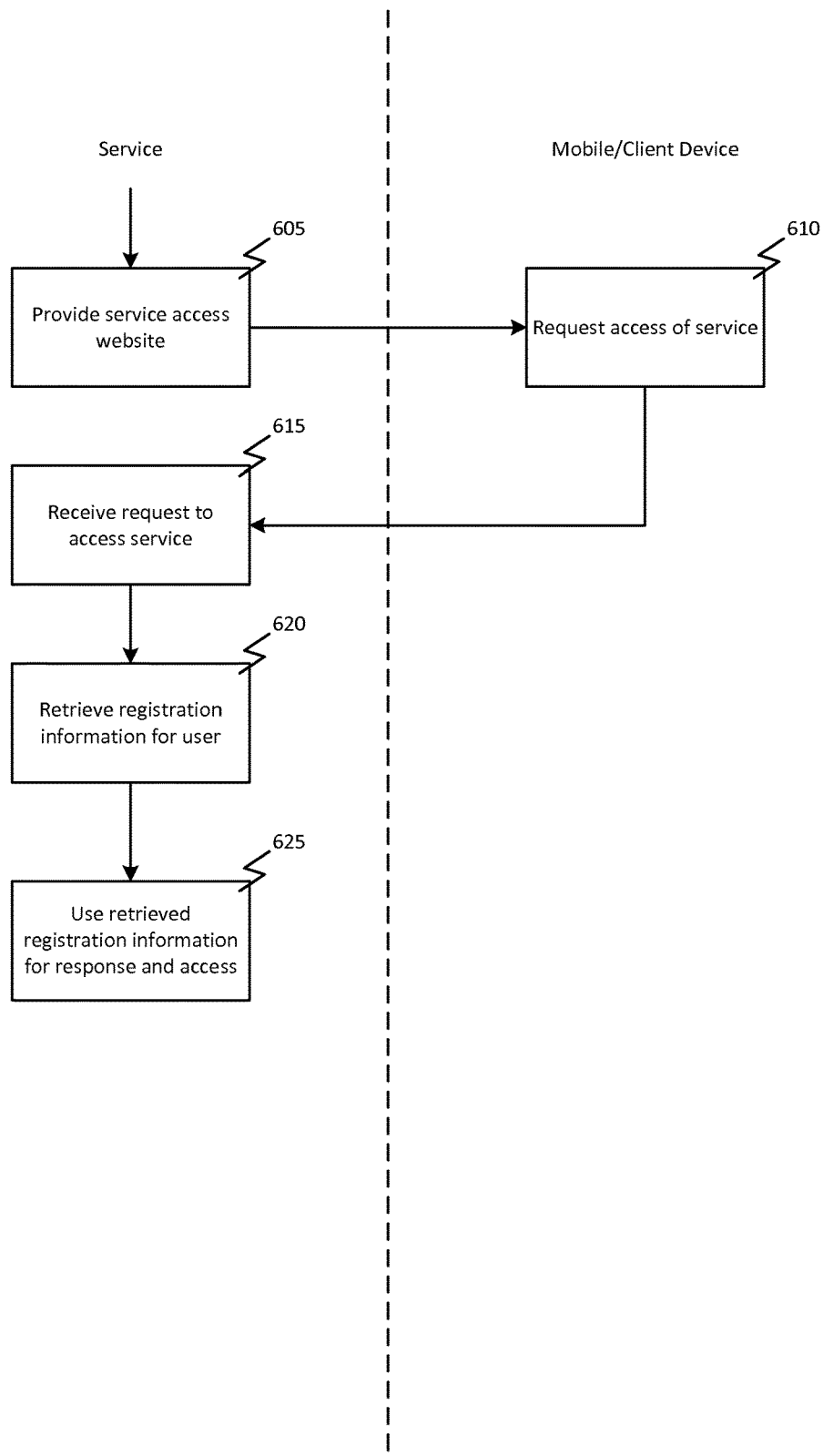
FIG. 6 is a flowchart illustrating a process for using an anti-phishing image according to one embodiment of the present invention.

FIG. 6 is a flowchart illustrating a process for using an anti-phishing image according to one embodiment of the present invention. As illustrated in this example, use of the registered information can begin with providing 605 an access function to a user of the service, for example, through an access website or other interface. The user can access 610 this website or interface through a mobile device and/or other client device as described above. In turn, the service can receive 615 an access request from the user. In response to this request, the saved anti-phishing image and registered location of the user can be retrieved 620 by the service and used 625 in an access process for the user. The anti-phishing image and registered location of the user can be used 625 by the service and the mobile device and/or other client device in different ways and in different combinations depending upon the exact implementation. Exemplary access processes will be described for illustrative purposes.

Figure 7:
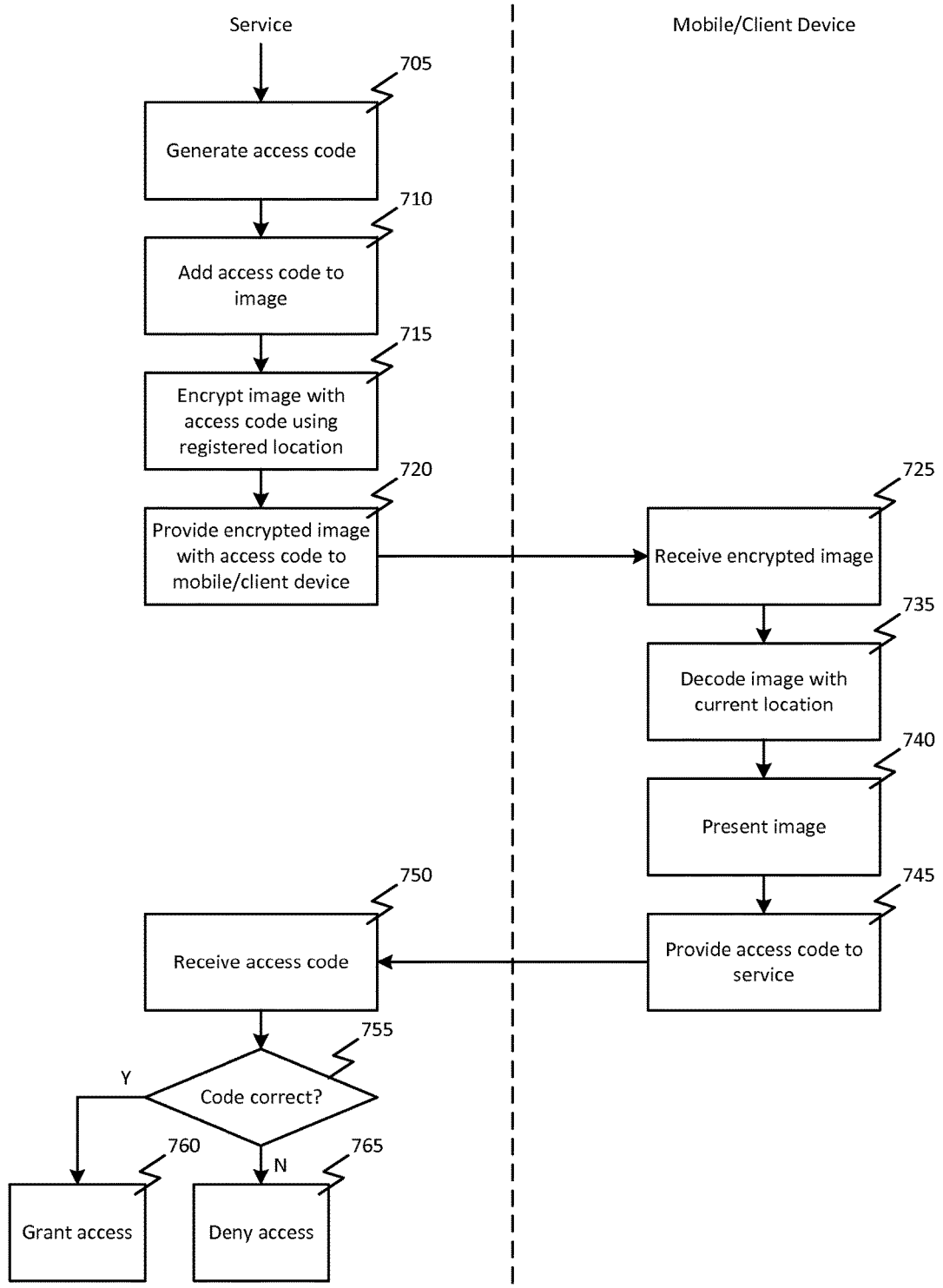
FIG. 7 is a flowchart illustrating additional details of a process for using an anti-phishing image according to one embodiment of the present invention.

FIG. 7 is a flowchart illustrating additional details of a process for using an anti-phishing image according to one embodiment of the present invention. As illustrated in this example, using 625 the retrieved anti-phishing image and registered location of the user in the response to the request and the access process for the user can comprise the service generating 705 a unique access code, adding 710 the generated unique access code to the anti-phishing image, encrypting 715 the anti-phishing image with the added unique access code using the registered location, and providing 720 the encrypted anti-phishing image to the user. For example, the access code can comprise an OTP or CAPTCHA code and adding the access code to the anti-phishing image can comprise overlaying the code onto the image, e.g., as a watermark etc.

The mobile device and/or other client device can receive 725 the encrypted anti-phishing image and attempt to decrypt 735 it with location information determined by the mobile device based on a current location of the mobile device. The decrypted anti-phishing image can be presented 740 to the user. If the mobile device is at the same location as the registered location, the image can be properly decoded and thus made visible/recognizable to the user. The user can then recognize the anti-phishing image and also read the included access code. This code can then be used by the user to access the service. In other words, the access code from the decrypted anti-phishing image can be provided 745 by the mobile device or other client device back to the service.

The service in turn can receive 750 the response from the user including the access code. A determination 750 can then be made by the service as to whether the code is correct, i.e., matches the generated access code provided with the image. In response to determining 755 the access code received from the user matches the generated unique access code, access to the service can be granted 760 to the user. If 755 the access code received from the user does not match the generated unique access code, access to the service can be denied 765.

Figure 8:
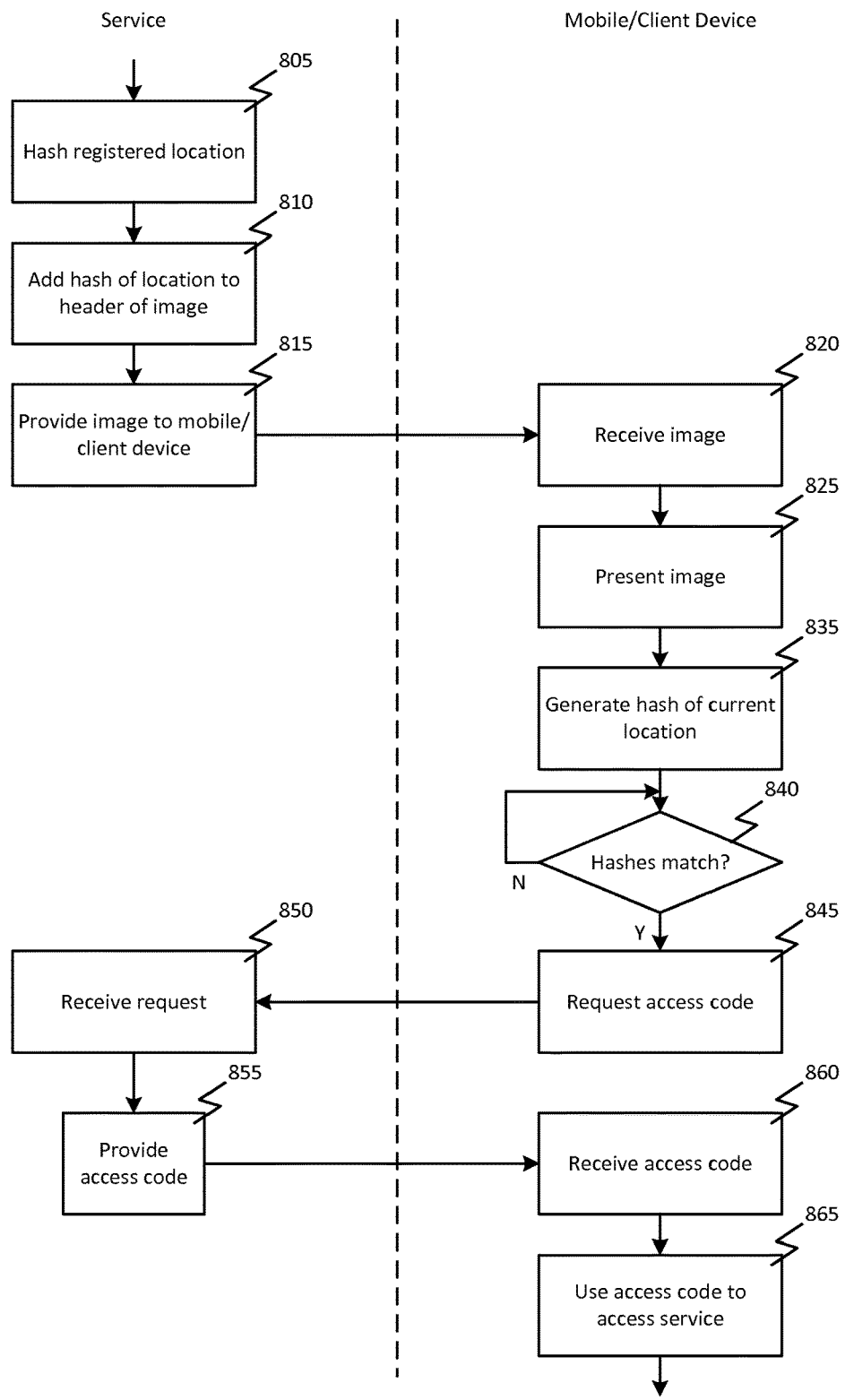
FIG. 8 is a flowchart illustrating additional details of a process for using an anti-phishing image according to another embodiment of the present invention.

FIG. 8 is a flowchart illustrating additional details of a process for using an anti-phishing image according to another embodiment of the present invention. As illustrated in this example, using 625 the retrieved anti-phishing image and registered location of the user in the response to the request and the access process for the user can comprise hashing 805 the registered location, adding 810 the hashed registered location to a header of the anti-phishing image, and providing 815 the anti-phishing image to the mobile device and/or other client device.

The mobile device and/or other client device can receive 820 the anti-phishing image and present 825 the received anti-phishing image to the user. The mobile device can also generate 835 a hash of the current location of the mobile device, i.e., using the same hash function used by the service, and determine 840 whether the hashed registered location received in the header of the anti-phishing image matches the generated hash of the current location of the mobile device. In response to the hashed registered location received in the header of the anti-phishing image matching the generated hash of the current location of the mobile device, an access code can be requested 845 by the mobile device.

The service can receive 850 this request from the mobile device. In response, the service can generate and provide 855 an access code to the mobile device. For example, the access code can comprise an OTP or CAPTCHA code.

The mobile device can receive 865 the requested access code and use 865 it to access the service. For example, the mobile device, or another device of the user through which the user enters the code, can provide the code back to the service. The service in turn can receive the code from the user and, in response to determining the access code received from the user is correct, i.e., matches the generated unique access code, access to the service can be granted to the user. If the access code received from the user does not match the generated unique access code, access to the service can be denied.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
  providing, during a registration process for a service, by a computer system, a plurality of images;
  receiving, during the registration process, by the computer system, a selection of an image from the plurality of images;
  receiving, during the registration process, by the computer system, location information indicating a geographic location of a mobile device that is participating in the registration process;
  saving, by the computer system, the image selected from the plurality of images;
  saving, by the computer system, the location information as a registered location; and
  responsive to receiving, by the computer system, a request from the mobile device to access the service:
    retrieving, by the computer system, the image and the registered location;
    encrypting the image using the registered location to create an encrypted image, the encrypting comprising:
      generating, by the computer system, a unique access code;

adding, by the computer system, the unique access code to the image; and generating, by the computer system, the encrypted image by encrypting, using the registered location, the image with the added unique access code; and providing, to the mobile device, by the computer system, the encrypted image, wherein the encrypted image is used to validate access to the service for the mobile device based on the mobile device using the registered location to decrypt the encrypted image.

2. The method of claim 1, further comprising:

determining, by the mobile device during the registration process, the geographic location of the mobile device; and providing, by the mobile device during the registration process, the location information based on determining the geographic location of the mobile device.

3. The method of claim 1, further comprising:

receiving the encrypted image at the mobile device;

decrypting, by the mobile device, the encrypted image using location information determined by the mobile device based on a current geographic location of the mobile device to obtain a decrypted image with an access code;

presenting, by the mobile device to a user of the mobile device, the decrypted image with the access code; and providing, by the mobile device to the service, the access code.

4. The method of claim 1, wherein the unique access code comprises a One Time Password (OTP).

5. The method of claim 1, wherein the unique access code comprises a Completely Automated Public Turing test to tell Computer and Humans Apart (CAPTCHA) code.

6. The method of claim 1, further comprising:

receiving, by the computer system, the unique access code from the mobile device; and validating access, by the computer system, for the mobile device to the service.

7. A system comprising:

a processor; and a memory coupled with and readable by the processor and storing therein a set of instructions which, when executed by the processor, causes the processor to perform a process comprising:

providing, during a registration process for a service, a plurality of images;

receiving, during the registration process, a selection of an image from the plurality of images;

receiving, during the registration process, location information indicating a geographic location of a mobile device that is participating in the registration process;

saving the image selected from the plurality of images;

saving the location information as a registered location; and responsive to receiving a request from the mobile device to access the service:

retrieving the image and the registered location;

encrypting the image using the registered location to create an encrypted image, the encrypting comprising:

generating a unique access code;

adding the unique access code to the image; and generating the encrypted image by encrypting, using the registered location, the image with the added unique access code; and providing, to the mobile device, the encrypted image, wherein the encrypted image is used to validate access to the service for the mobile device based on the mobile device using the registered location to decrypt the encrypted image.

8. The system of claim 7, wherein the unique access code comprises a One Time Password (OTP).

9. The system of claim 7, wherein the unique access code comprises a Completely Automated Public Turing test to tell Computer and Humans Apart (CAPTCHA) code.

10. The system of claim 7, wherein the memory has stored therein further instructions, which, when executed by the processor, causes the processor to perform the process comprising:

receive the unique access code from the mobile device; and validate access for the mobile device to the service.

11. A mobile device comprising:

a processor; and a memory coupled with and readable by the processor and storing therein a set of instructions which, when executed by the processor, causes the processor to perform a process comprising:

receiving, from a computer system, during a registration process for a service, a plurality of images;

providing, to the computer system, during the registration process, a selection of an image from the plurality of images;

determining, during the registration process, location information indicating a geographic location of the mobile device;

providing, to the computer system, during the registration process, the location information as a registered location;

requesting access to the service;

receiving, from the computer system, in response to the request, an encrypted image comprising a unique access code, wherein the encrypted image is encrypted using the registered location; and using the encrypted image to validate access to the service based on decrypting the encrypted image using the registered location.

12. The mobile device of claim 11, wherein using the encrypted image to validate access to the service comprises:

decrypting the encrypted image with location information determined by the mobile device based on a current geographic location of the mobile device to generate a decrypted image with an access code;

presenting the decrypted image with the access code to a user of the mobile device; and providing the access code to the service.

13. The mobile device of claim 11, wherein the unique access code comprises a One Time Password (OTP).

14. The mobile device of claim 11, wherein the unique access code comprises a Completely Automated Public Turing test to tell Computer and Humans Apart (CAPTCHA) code.

15. A non-transitory computer-readable memory storing computer-executable instructions, when executed by one or more processors, cause the processor perform a process executable by one or more processors, the computer-executable instructions comprising:

instructions that cause the one or more processors to provide, during a registration process for a service, a plurality of images;

instructions that cause the one or more processors to receive, during the registration process, a selection of an image from the plurality of images;

instructions that cause the one or more processors to receive, during the registration process, location information indicating a geographic location of a mobile device that is participating in the registration process;

instructions that cause the one or more processors to save the image selected from the plurality of images;

instructions that cause the one or more processors to save the location information as a registered location; and instructions that cause the one or more processors to, responsive to receiving a request from the mobile device to access the service:

retrieve the image and the registered location;

encrypt the image using the registered location to create an encrypted image by:

generating a unique access code;

adding the unique access code to the image; and generating the encrypted image by encrypting, using the registered location, the image with the added unique access code;

and provide, to the mobile device, the encrypted image, wherein the encrypted image is used to validate access to the service for the mobile device based on the mobile device using the registered location to decrypt the encrypted image.

16. The non-transitory computer-readable memory of claim 15, wherein the unique access code comprises a One Time Password (OTP).

17. The non-transitory computer-readable memory of claim 15, wherein the unique access code comprises a Completely Automated Public Turing test to tell Computer and Humans Apart (CAPTCHA) code.

18. The non-transitory computer-readable memory of claim 15, wherein the computer-executable instructions further comprise:

instructions that cause the one or more processors to receive the unique access code from the mobile device; and instructions that cause the one or more processors to validate access for the mobile device to the service.

\* \* \* \* \*

UNITED STATES PATENT AND TRADEMARK OFFICE
CERTIFICATE OF CORRECTION

| | |
|---|---|
| PATENT NO. | : 10,069,864 B2 |
| APPLICATION NO. | : 14/663555 |
| DATED | : September 4, 2018 |
| INVENTOR(S) | : Anantharaju |

Page 1 of 1

It is certified that error appears in the above-identified patent and that said Letters Patent is hereby corrected as shown below:

In the Specification

In Column 5, Lines 40-41, delete "BlackBerry®," and insert -- BlackBerry 10, --, therefor.

In the Claims

In Column 22, Line 62, in Claim 15, after "processor" insert -- to --.

Signed and Sealed this
Sixteenth Day of July, 2019

Andrei Iancu
*Director of the United States Patent and Trademark Office*